United States Patent [19]

Sgaslik et al.

[11] 4,225,327
[45] Sep. 30, 1980

[54] FILTER FOR PURIFICATION OF GASES

[75] Inventors: Friedrich Sgaslik, Regensburg; Detlef Nalaskowski, Bayreuth, both of Fed. Rep. of Germany

[73] Assignee: Lufttechnik Bayreuth Ruskamp GmbH, Fed. Rep. of Germany

[21] Appl. No.: 954,992

[22] Filed: Oct. 26, 1978

Related U.S. Application Data

[63] Continuation of Ser. No. 784,918, Apr. 5, 1977, abandoned.

[30] Foreign Application Priority Data

Apr. 13, 1976 [DE] Fed. Rep. of Germany ....... 2616250
Feb. 5, 1977 [DE] Fed. Rep. of Germany ....... 2704854

[51] Int. Cl.² ..................... B01D 50/00; B01D 23/16; B01D 33/00
[52] U.S. Cl. ......................................... 55/324; 55/430; 55/459 R; 55/474; 55/479; 55/484; 55/512
[58] Field of Search ..................... 55/98, 99, 390, 474, 55/479, 512, 517, 324, 459 R, 430, 484

[56] References Cited

U.S. PATENT DOCUMENTS

| 2,488,493 | 11/1949 | Evans | 55/474 X |
| 2,564,316 | 8/1951 | Veron | 55/474 X |
| 3,685,262 | 8/1972 | Kressley | 55/474 X |
| 3,770,388 | 11/1973 | Zenz | 55/98 X |
| 3,940,237 | 2/1976 | Gonzalez et al. | 55/474 X |
| 4,017,278 | 4/1977 | Reese | 55/479 X |

FOREIGN PATENT DOCUMENTS

| 504089 | 12/1951 | Belgium | 55/430 |
| 418008 | 8/1925 | Fed. Rep. of Germany | 55/479 |
| 457430 | 3/1928 | Fed. Rep. of Germany | 55/474 |
| 563019 | 11/1923 | France | 55/474 |

Primary Examiner—Kathleen J. Prunner
Attorney, Agent, or Firm—Jacobs & Jacobs

[57] ABSTRACT

The present invention relates to a filter apparatus for the purifying of gases, having at least one filter space which has at least one upper inlet and one lower inlet for a filter medium containing solid particles which passes through said space, the gas to be purified flowing through said space in countercurrent to the filter medium. In this filter apparatus, at least one removing device which moves relative to the filter space, for instance a scraper, is provided at the outlet for the filter medium, said device moving through a cone of the filter medium which forms at the outlet so as to remove, in each case, at least a part of the filter medium from the cone.

17 Claims, 4 Drawing Figures

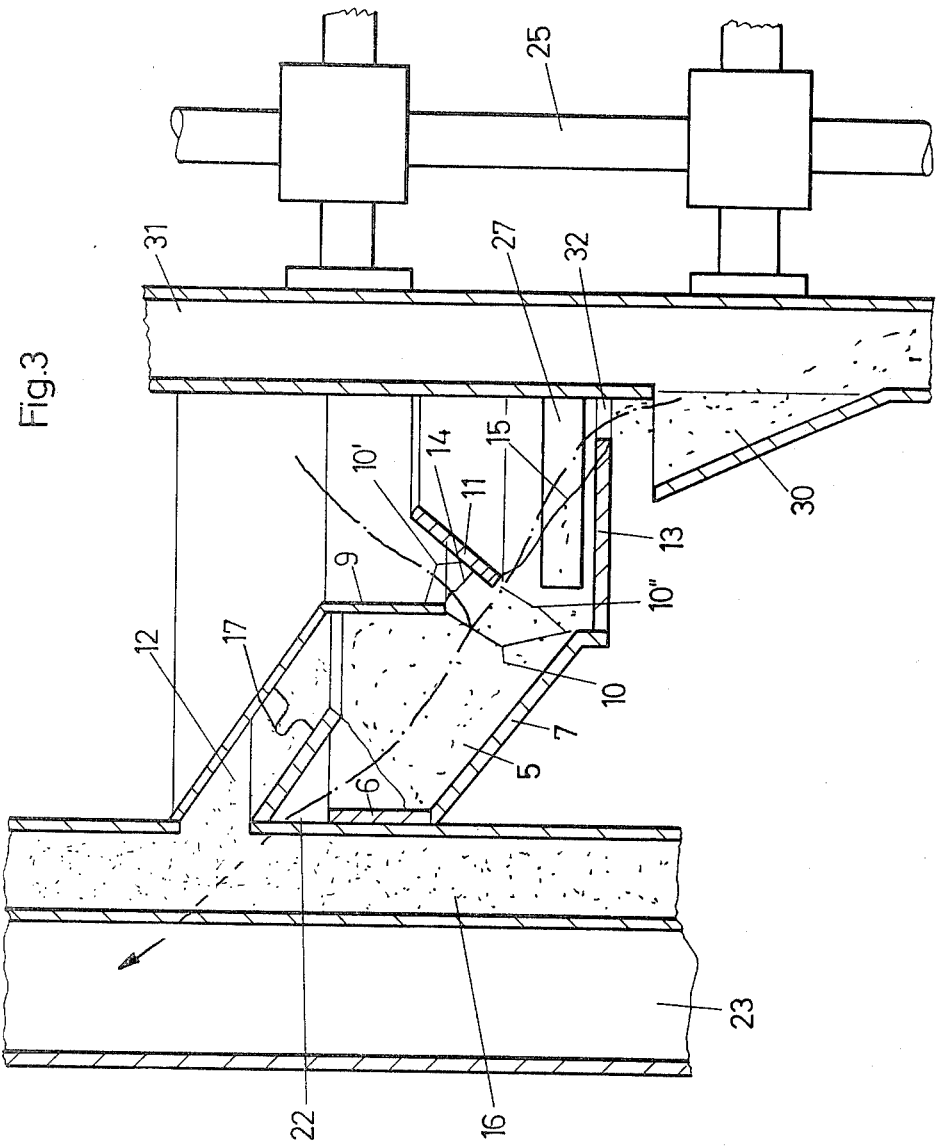

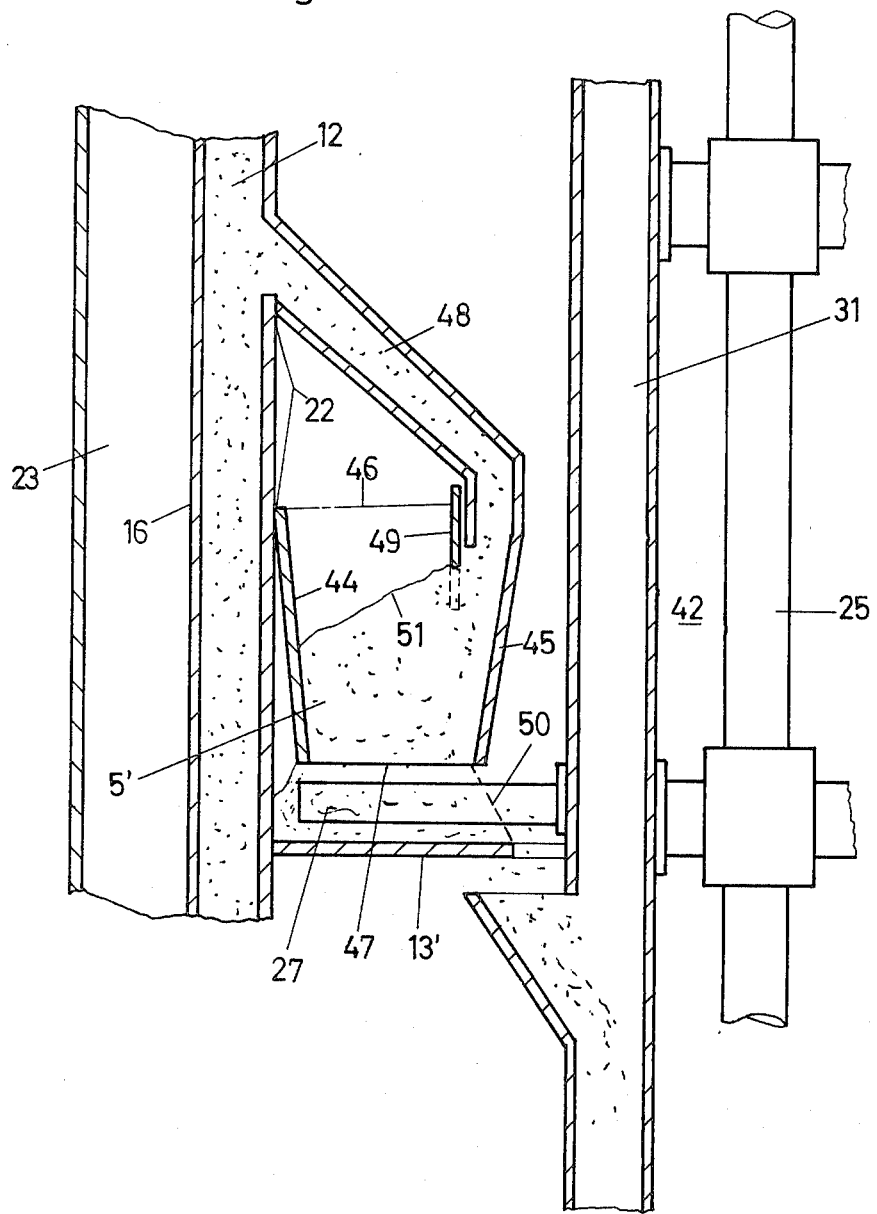

FILTER FOR PURIFICATION OF GASES

CROSS-REFERENCE

This is a continuation of Ser. No. 784,918 filed Apr. 5, 1977 and now abandoned.

The present invention relates to a filter apparatus for the purification of gases, having at least one filter space which has at least one upper inlet and one lower outlet for a filter medium containing solid particles which moves through said space, the gas to be purified flowing through said space in countercurrent to the filter medium.

Filter apparatus of this type are known per se and are used, for instance, for the removing of dust from air or waste gases in the manufacture of lime-cement. Filter systems of this type are frequently referred to as "countercurrent packed bed filters" (GS filters).

Suitable filter media for filters of this type comprise ordinary filter gravel or else fractions of the same material as forms the solid material present in the process and to which, for instance, the particles which are contained in the gas or air to be purified and are to be removed by filtering are to be returned.

The object of the invention is to improve a filter of the aforementioned type so as to obtain, through the filter space, with optimum filtering effect, a uniform flow which, in particular, is adapted also to the specific requirements or the fraction of particles and substances which are present in the gas to be purified and are to be removed from it.

In order to achieve this purpose a filter of the aforementioned type is developed, in accordance with the invention, in the manner that at least one removing device which moves relative to the filter space, for instance a suitable scraper, is provided at the outlet for the filter medium said device moving through a first cone of the filter medium which forms at the outlet so as in each case to remove at least a part of the filter medium from the cone.

The filter of the invention is characterized by simple construction and good filtering action and has the possibility of optimal adjustment to the specific operating conditions. The filter of the invention is suitable not only for the extracting of dust from gases but can also be used for the filtering of other substances from a gas, physically or chemically active filter aids being used in particular in the latter case.

In a preferred embodiment of the filter in accordance with the invention, a plurality of filter spaces having corresponding removing devices are arranged one above the other these filter spaces lying parallel to each other with respect to the flow of gas and being preferably of annular shape. In this way particularly good conditions can be obtained with respect to the velocity of flow of the gas in the filter medium, particularly when, in the case of annular filter spaces, the inlet for the gas (crude gas) is provided on the inner wall and the outlet for the purified gas (clean gas) is provided on the outer wall of the filter space or spaces, so that the velocity of flow of the gas in the filter medium decreases from inlet to outlet.

The invention will be explained on basis of an illustrative example, referring to the drawing in which:

FIG. 3 shows in side view and in cross section one filter space of the filter according to FIG. 1, together with the removal device;

FIG. 4 is a similar view of FIG. 3, but showing a modified embodiment.

The filter shown in the figures consists of a housing part 1 which is closed at its top by a frustoconical connecting part 2 having a central opening 3 for the feeding of a filter medium containing solid particles. The bottom of the cylindrical housing part 1 is connected with a cylindrical space 4 which serves as pre-separator for the crude gas to be purified.

Figure 1:
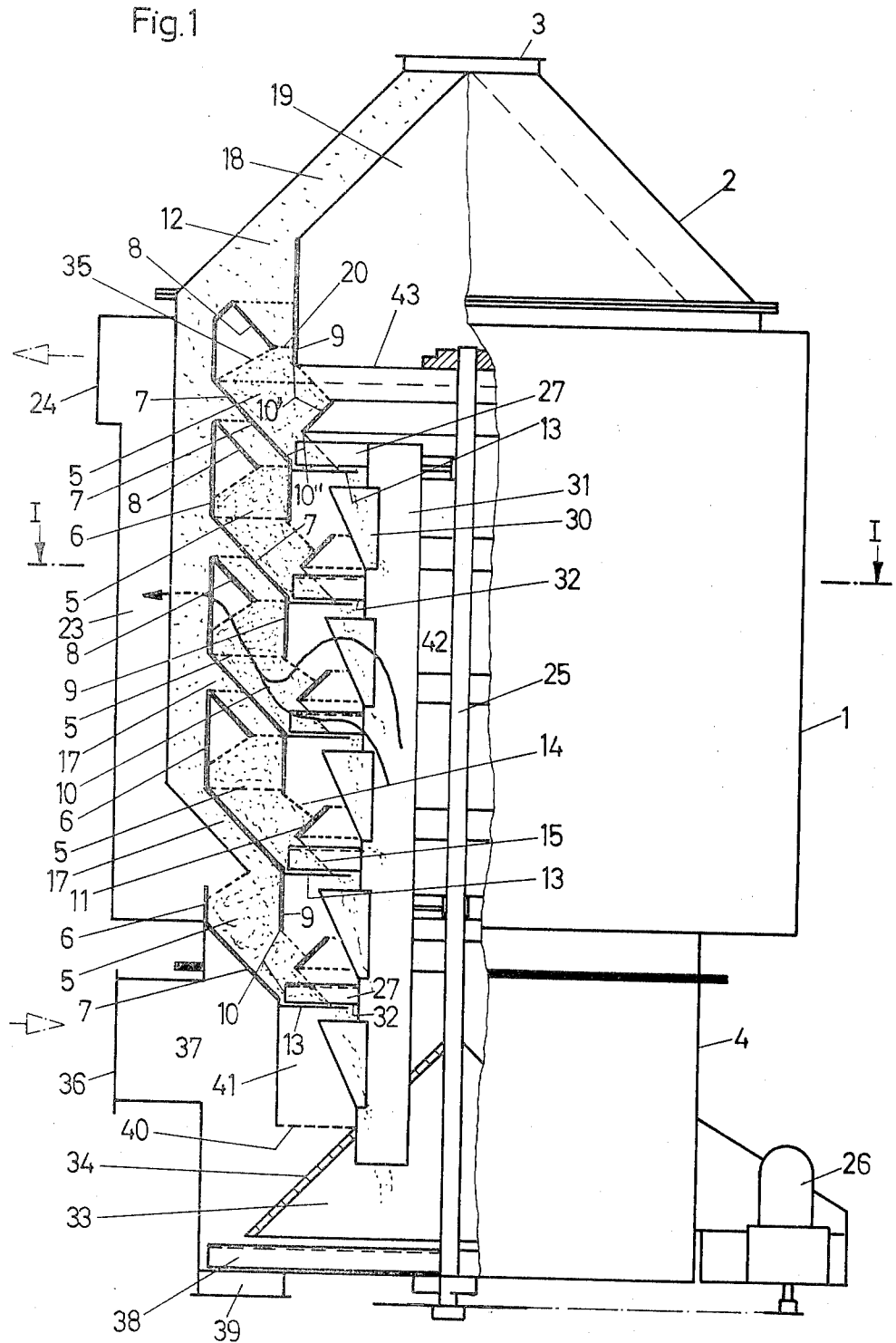
FIG. 1 shows in side view and partially in section one embodiment of the filter in accordance with the invention.

Within the housing part 1 there are arranged fixed in position one above the other five annular filter spaces or filter chambers 5 whose lateral limiting surfaces have been shown in heavy lines in FIG. 1 for greater clarity. These filter chambers 5 are substantially of similar development and each of them consists of a vertically or perpendicularly extending annular outer wall 6, a bottom wall 7 which is inclined from the outside obliquely downward in the direction towards the center of the housing part 1, a guide wall 8 extending from the upper outer edge of the filter chamber 5 parallel to the bottom wall 7, said guide surface continuing up to approximately the center of the corresponding filter space 5, and of an annular inner wall 9. On the lower end of the oblique bottom wall 7 an opening 10 is provided which is bounded by the inner wall 9 and the walls forming the bottom surface 7 and/or a horizontally extending surface 13 and, which opening is developed as a continuous annular slot and is divided by an outer divider wall 11 which, starting from the end thereof facing away from the filter space passes obliquely downwards to the filter space 5 and terminates approximately below the lower edge of the inner wall 9, into two individual openings 10' and 10", the individual opening 10" forming the outlets for the removal of the filter medium 12 out of the filter chambers 5. Adjoining the lower edge of each individual opening 10' is an outer horizontally extending annular wall 13. The upper surfaces of walls 11 and 13 serve in this connection as surfaces on which deposits 14 and 15 (FIG. 3) of filter medium 12 are formed.

Corresponding to the annular development of the filter chambers 5, the outer wall 6 and the inner wall 9 are each formed by a hollow cylindrical sheet-metal part and the bottom wall 7, the guide wall 8, and the divider wall are formed of a frustoconical sheet metal part, while the annular wall 13 is an annular flat sheet-metal part having a circular central recess. All sheet-metal parts are held fixed in place in the housing part 1 and connected with each other by welding or possibly by struts, not shown in detail.

For the feeding of the filter medium 12 into the individual filter chambers 5 which are arranged one above the other there are provided a plurality of vertically extending channels 16 which are distributed around the outer periphery of the filter chambers 5 and communicate, via openings 17, with an individual filter chamber 5. All channels 16 at their upper end discharge into a common space or storage chamber 18 which is defined, towards the outside, by the wall of the closure part 2, and, towards the inside, by a cone 19, the apex of which faces the opening 3 and the axis of symmetry of which coincides with the center line of said opening.

In the embodiment shown, the uppermost filter chamber 5 is supplied with the filter medium 12 through the opening 20 directly from the storage chamber 18.

Each filter chamber 5 is provided in its upper region at the outer wall 6 with an opening 22 which is preferably developed as an annular slot which extends around the entire circumference of the filter chamber 5 and is interrupted merely by the channels 16. Via this opening 22, the filter chambers 5 are connected with an outer annular gas collecting space or chamber 23, which surrounds said filer chambers as well as the channels 16 and its upper end has a connection 24 for the discharge of the purified gas or clean gas.

Within the housing part 1 there is rotatably supported a vertical shaft 25 which, in the case of the embodiment shown in the drawing, extends through the cylindrical space 4 and is frictionally connected at its lower end with the shaft of an electric motor 26 by a force transmission device, for instance a belt or chain. On the shaft 25, five scrapers 27 are fastened one above the other, each scraper 27 being arranged directly above a wall 13 of a filter chamber 5. Each scraper 27 consists of a bent lateral wall section 28 extending perpendicular or transverse to the wall 13 and of an upper cover 29 which serves as stiffening surface and at the same time is intended to prevent the development or eddying of dust when the scrapers 27 move through the deposit 15 at the walls 13 upon the rotation of the shaft 25.

On the side of the wall 13 facing away from the scraper 27, each scraper has associated with it a collection pocket 30 which is developed in funnel shape and discharges into a common stack 31 for all the collection pockets, said stack bearing the collection pockets 30 and being eccentrically fastened to the shaft 25 so that the stack 31 with the collection pockets 30 rotates together with the scrapers 27 upon the rotation of the shaft 25. Between the inner edges of the surfaces 13 and the stack 31 there is provided a slot 32 through which filter medium 12, conducted by the corresponding scraper 27 in the direction towards the center of the housing part 1, passes into the collection pocket 30 and from there into the stack 31 whose lower end discharges into a collection chamber 33 which is closed off towards the top by a conical wall 34, which is also fastened to the shaft 25.

It is clear that several stacks 31 may also be distributed around the shaft 25, in which case the surface 13 of at least one filter chamber 5 has associated with it a number of collection pockets 30 and scrapers 27 which corresponds to the number of said stacks 31.

The manner of operation of the filter shown is as follows:

The filter medium 12 is fed via the opening 3 and distributes itself via the chamber 18 and the channels 16 over the individual filter chambers 5, the deposits 14 and 15 being produced at the openings 10' and 10" respectively and another deposit 35 being furthermore formed below the guide wall 8. The gas to be purified (crude gas) is fed via the tubular connection piece 36, which discharges tangentially into the space or chamber 37 of the cylindrical space 4 which lies above the conical wall 34. The chamber 37 serves in this connection, in known manner, as preseparator for heavy particles of dust contained in the crude gas which, as a result of the cyclone flow which forms in the chamber 37, are conducted downward and conveyed therefrom, by a removal device 38 which rotates with the shaft 25 and is common to the collection chamber 33 and the chamber 37, into an outlet channel 39 for the spent filter medium 12. The crude gas passes through the lower opening 40 of a dip pipe 41 into an inner crude gas space or chamber 42, which is surrounded by the filter chambers 5, is closed towards the top by a partition 43 and in which the scrapers 27, the stack 31, and the collection pockets 30 rotate.

From the crude gas space 42 the crude gas then passes via the deposits 14 or 15 into the individual filter chambers, whereby the substances which are contained in the gas and are to be filtered out (particles of dust and other foreign or injurious substances to be filtered out) are deposited in the filter medium 12 so that the gas leaves the filter chambers 5 at the deposit 35 of filter material in purified condition and passes into the collecting chamber 23 from which the purified gas (clean gas) is discharged via the connection 24. Upon each rotation of the shaft 25 the scrapers 27 rotating with the shaft 25 in each case convey a given quantity of spent filter medium from each cone 15 and thus from each filter chamber 5 via the collection pockets 30 the shaft 31 and the removal device 38 to the outlet 39 for the spent filter medium. The quantity of filter medium 12 removed from the filter chambers 5 and thus the velocity of flow of said filter medium being capable of being controlled or adapted to the specific requirements by the speed of rotation of the shaft 25, the filter medium removed by the scrapers 27 being replaced in each case by unspent filter medium which slides down through the openings 17 and 20.

Figure 2:
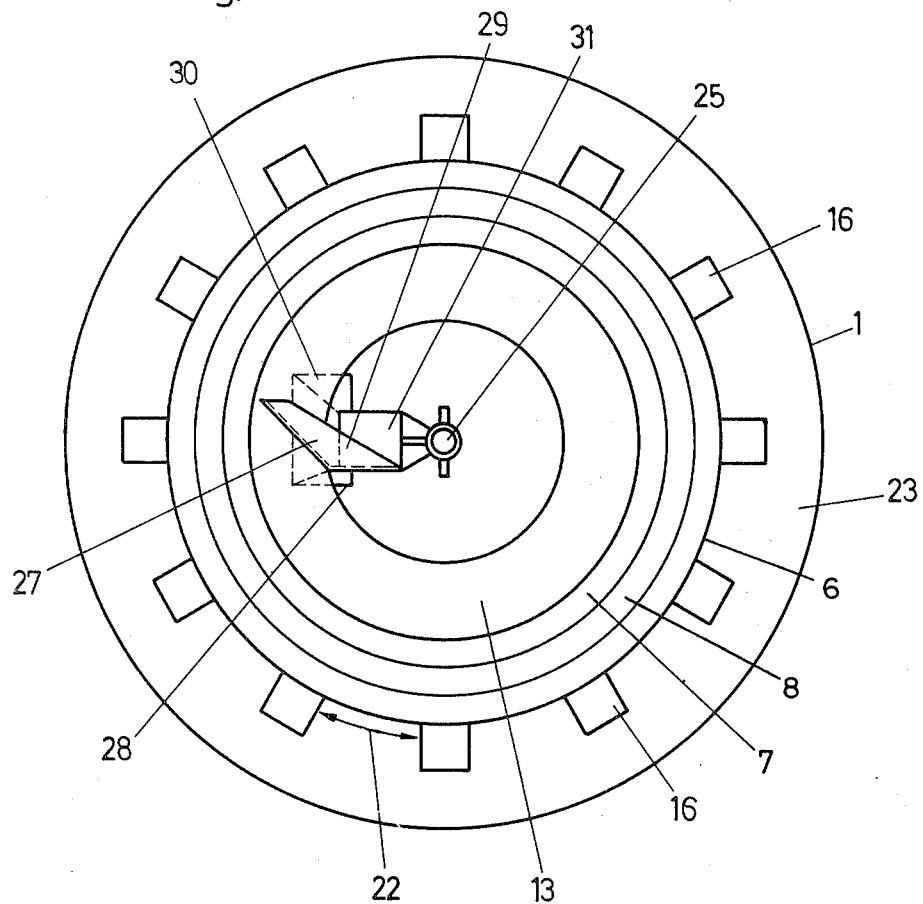
FIG. 2 is a section along the line I—I of FIG. 1.

In the embodiment of the filter of the invention which has been shown in FIGS. 1-3 it is essential that the filter medium 12 flow in each case through the individual filter chambers 5 from the top to the bottom while the gas flows through these filter chambers in the reverse direction, i.e. from the bottom to the top. In this way excellent filtering results can be obtained, particularly also by utilization of the rate of descent of the substance to be removed or filtered out. In the embodiment shown in FIGS. 1 to 3 furthermore, due to the feeding of the crude gas at the inner wall 9 and the discharge of the clean gas at the outer wall 6 or in the region of the slot-shaped opening 22 which is interrupted merely by the channels 16, the result is obtained, with suitable dimensioning of the individual openings 10' and 10", that the velocity of flow of the gas in each filter chamber continuously decreases from the deposits 14 and 15 to the deposit 35, with the result that even very fine particles are retained in the filter chamber 5 and in the filter medium 12.

If the crude gas to be purified contains particles of dust which tend to bake together or form lumps within the filter medium which flows through the filter chambers, it is advisable to develop the filter spaces in the manner shown in FIG. 4 in order to avoid the presence within the filter chambers of surfaces, such as the bottom surface 7 in the embodiment of FIGS. 1 to 3, on which filter medium which has been agglomerated with dust particles can deposit itself in the form of lumps, thus impairing the filtering properties.

In the embodiment shown in FIG. 4, the filter chamber 5' which annularly surrounds the shaft 25 is formed by two annular walls 44 and 45, these walls 44 and 45, which represent substantially concentric rings, having an angle of inclination of about 5° with respect to the vertical and the axis of the shaft 25. The filter space or chamber 5' has an upper opening 46 and a lower opening 47, the said filter chamber having a slightly greater width in the region of the upper opening 46 than in the region of the lower opening 47 as a result of the inclination of the walls 44 and 45. The feeding of the filter medium in this embodiment also is effected through a plurality of channels 16 distributed uniformly around the filter chamber 5' which channels provide the filter chamber 5' with the filter medium 12 via connecting pipes 48. The connecting pipes 48 discharge in each case at one end into a channel 16 and at the other (lower) end into the filter chamber 5'. A displaceable ring 49 is provided at the end of the discharge pipes 48 discharging into the filter chamber 5', said ring extending around all the connecting pipes 48; by means of said ring, by suitable vertical displacement, the height of the filter medium 12 which is deposited in the filter chamber 5' can be adjusted.

Opposite the lower opening 47 there is provided, fixed in space, a wall 13' which in this case also may be formed of an annular part which is connected or welded at its outer circumference to the channel 16. On this wall 13' there is formed a deposit 50 of the filter medium 12 through which then, in the same manner as in the case of the deposit 15 of FIGS. 1 and 3, the scraper 27 connected with the shaft 25 or with the stack 31 moves upon rotation of the shaft 25 around the vertical axis.

Aside from the special development of the filter chamber 5', the embodiment shown in FIG. 4 does not differ either in operation or in the rest of its design from the embodiment shown in FIGS. 1 to 3. It is possible also in the case of the embodiment shown in FIG. 4 to arrange a plurality of filter chambers 5' concentrically above each other around the shaft 25, the stream of crude gas from the crude gas space 42, which is surrounded by the filter chamber 5' or filter chambers 5', entering the corresponding filter chamber 5' at the filter deposit 50. The purified gas then leaves the corresponding filter chamber 5' at the filter deposit 51 which is formed at the lower end of the connecting pipe or pipes 48 and passes through the slotshaped openings 22 between the individual channels 16 into the collection space 23 for the purified gas.

Since the annular or frustoconical filter deposit 50 is closer to the axis of symmetry of the filter or axis of rotation of the shaft 25 than the filter deposit 51 which is also of annular or frustoconical development and since furthermore the filter deposit 50, as a result of the relatively small distance between the lower opening 47 and the surface 13' in the sectional plane shown for FIG. 4, has a smaller length than the deposit 51, it is seen in this embodiment of the filter of the invention, that the crude gas enters into the filter chamber 5' via a relatively small opening (filter deposit 50) and that the purified gas leaves the filter chamber 5' via a relatively large opening (filter deposit 51), so that in this embodiment there is also a retardation of the flow of gas in the filter chamber 5' from the inlet (filter deposit 50) to the outlet (filter deposit 51) without oblique wall surfaces which favor the depositing of filter material or the formation of lumps being necessary.

As filter medium for the filter of the invention there is suitable for instance ordinary filter gravel or fractions of the material which forms the bulk material present in the operating process and onto which, for instance, the dust particles etc., contained in the gas to be purified are to be returned. Furthermore, in case of certain uses the filter medium can consist of activated charcoal or else of plastic particles which latter are electrostatically charged and as a result of such charge bind particles of dust and other substances to be filtered out.

The purification of the spent or contaminated filter medium is effected in the case of the filter of the invention in the customary manner, for instance by means of a perforated worm, a fluidization trough, a screen or a sifter.

The invention has been explained above by reference to illustrative embodiments. It is obvious that modifications thereof are possible without thereby going beyond the inventive concept.

What is claimed is:

1. Apparatus for the purification of gases comprising:
   (a) a plurality of annular filter chambers concentrically arranged with respect to a common vertical axis one above the other, said filter chambers each having outer annular wall means, inner annular wall means and bottom wall means defining said filter chambers, and each containing a filter medium;
   (b) an inner gas chamber surrounded by said filter chambers, and an outer gas collection chamber surrounding said filter chambers with the inner wall means and the outer wall means of each filter chamber separating each filter chamber from said inner and outer gas chambers, respectively;
   (c) a storage chamber for storing fresh filter medium, a filter medium inlet means at the top of each filter chamber, channel means for establishing direct communication between said storage chamber and each filter medium inlet means for downward flow of fresh filter medium directly into each said filter chamber from said storage chamber, and an annular opening at the lower part of each inner wall means defining a spent filter medium outlet for the downward flow of spent filter medium out of each filter chamber;
   (d) said annular opening being in communication with said inner gas chamber and each filter chamber having an upper gas outlet in communication with said outer gas chamber to provide a path of flow of gas from said inner chamber through each filter chamber via said annular opening and thence to said outer chamber via said upper gas outlet substantially countercurrent to the flow of filter medium;
   (e) a horizontally disposed annular wall means adjacent and below each annular opening and extending from said bottom wall means of each filter chamber into the interior of said inner gas chamber, the upper surface of said annular wall means being adapted to support thereon a deposit of spent filter medium discharged from each filter chamber via said annular opening;
   (f) a rotatable shaft within said inner gas chamber, means for rotating said shaft, a plurality of scrapers mounted on said shaft, at least one of said scrapers being located at each annular opening and above said upper surface, and a plurality of collection pockets mounted on said shaft, at least one of said pockets being located below each said annular wall means, said scrapers being operable, when said shaft is rotated, to move across said upper surface of said annular wall means and thereby push said spent filter medium deposited thereon off said annular wall means and into said pockets; and
   (g) stack means mounted on said shaft, each collection pocket communicating with said stack means so as to discharge spent filter medium into said stack means, and a collection chamber separated from said inner gas chamber by a wall means, the lower end of said stack means communicating with said collection chambers so as to discharge spent filter medium passing therethrough into said collection chamber.

2. Apparatus according to claim 1, wherein the bottom wall means of each filter chamber is inclined obliquely downward towards said annular opening.

3. Apparatus as claimed in claim 1, wherein each inner wall means is formed by a vertically extending ring-like wall.

4. Apparatus as claimed in claim 1, wherein each outer wall means is formed by a vertically extending outer ring-like wall.

5. Apparatus as claimed in claim 1, wherein each filter chamber has a guide wall for the filter medium extending from the filter medium inlet means obliquely downward into the inside of each filter chamber, said upper gas outlet of each said filter chamber being beneath said guide wall.

6. Apparatus as claimed in claim 1, wherein said stack means is fastened eccentrically to the shaft.

7. Apparatus as claimed in claim 1, wherein there is provided a preseparator chamber for separating solid particles from said gas to be purified, said preseparator chamber leading to the lower part of said inner gas chamber and being separated by said wall means from said collection chamber.

8. Apparatus as claimed in claim 7, wherein the wall means is conical, the interior of the conical wall means forming the collection chamber for receiving spent filter medium.

9. Apparatus as claimed in claim 7 wherein the preseparator chamber is a cylindrical chamber having a tubular inlet disposed tangentially thereto.

10. Apparatus as claimed in claim 1, wherein said stack means is vertical.

11. Apparatus for the purification of gases, comprising:
(a) a plurality of annular filter chambers concentrically arranged with respect to a common vertical axis one above the other, said filter chambers each having outer annular wall means, inner annular wall means and bottom wall means defining said filter chambers, and each containing a filter medium;
(b) an inner gas chamber surrounded by said filter chambers, and an outer gas collection chamber surrounding said filter chambers with the inner wall means and the outer wall means of each filter chambers separating each filter chamber from said inner and outer gas chambers, respectively;
(c) a storage chamber for storing fresh filter medium, a filter medium inlet means at the top of each filter chamber, channel means for establishing direct communication between said storage chamber and each filter medium inlet means for downward flow of fresh filter medium directly into each said filter chamber from said storage chamber, and an annular opening at the lower part of each inner wall means defining a spent filter medium outlet for the downward flow of spent filter medium out of each filter chamber;
(d) said annular opening being in communication with said inner gas chamber and each filter chamber having an upper gas outlet in communication with said outer gas chamber to provide a path of flow of gas from said inner chamber through each filter chamber via said annular opening and thence to said outer chamber via said upper gas outlet substantially countercurrent to the flow of filter medium;
(e) a horizontally disposed annular wall means adjacent and below each annular opening and extending from said bottom wall means of each filter chamber into the interior of said inner gas chamber, and divider wall means angularly disposed in each said annular opening so as to define an upper surface, the upper surface of said annular wall means and of said divider wall means each being adapted to support thereon a deposit of spent filter medium, said divider wall means dividing each annular opening into two superimposed annular openings, the lower annular opening being the outlet opening for spent filter medium as well as an inlet for the gas to be purified, the upper opening being only an inlet for the gas to be purified;
(f) a rotatable shaft within said inner gas chamber, means for rotating said shaft, a plurality of scrapers mounted on said shaft, at least one of said scrapers being located at each lower annular opening and above said upper surface of said annular wall means, and a plurality of collection pockets mounted on said shaft, at least one of said pockets being located below each said annular wall means, said scrapers being operable, when said shaft is rotated, to move across said upper surface of said annular wall means and thereby push said spent filter medium deposited thereon off said annular wall means and into said pockets; and
(g) stack means mounted on said shaft, each collection pocket communicating with said stack means so as to discharge spent filter medium into said stack means, and a collection chamber separated from said inner gas chamber by a wall means, the lower end of said stack means communicating with said collection chamber so as to discharge spent filter medium passing therethrough into said collection chamber.

12. Apparatus according to claim 11, wherein the upper surface of each divider wall means is inclined obliquely towards its respective filter chamber from the side of said surface facing away from the filter chamber.

13. Apparatus for the purification of gases comprising:
(a) a plurality of annular filter chambers concentrically arranged with respect to a common vertical axis one above the other, said filter chambers each having inner and outer annular wall means and each containing a filter medium;
(b) an inner gas chamber surrounded by said filter chambers, and an outer gas collection chamber surrounding said filter chambers;
(c) a storage chamber for storing fresh filter medium, a filter medium inlet means at the top of each filter chamber, channel means for establishing direct communication between said storage chamber and each filter medium inlet means for downward flow of fresh filter medium directly into each said filter chamber from said storage chamber, and an annular opening at the lower part of each inner wall means defining a spent filter medium outlet for the downward flow of spent filter medium out of each filter chamber;
(d) said annular opening being in communication with said inner gas chamber, and each filter chamber having an upper gas outlet in communication with said outer gas chamber to provide a path of flow of gas from said inner chamber through each filter chamber via said annular opening and thence to said outer chamber via said upper gas outlet substantially countercurrent to the flow of filter medium;

(e) a horizontally disposed annular wall means adjacent and below each annular opening and extending into the interior of said inner gas chamber, the upper surface of said annular wall means being adapted to support thereon a deposit of spent filter medium discharged from each filter chamber via said annular opening;

(f) a rotatable shaft within said inner gas chamber, means for rotating said shaft, a plurality of scrapers mounted on said shaft, at least one of said scrapers being located at each annular opening and above said upper surface, and a plurality of collection pockets mounted on said shaft, at least one of said pockets being located below each said annular wall means, said scrapers being operable, when said shaft is rotated, to move across said upper surface of said annular wall means and thereby push said spent filter medium deposited thereon off said annular wall means and into said pockets; and (g) stack means mounted on said shaft, each collection pocket communicating with said stack means so as to discharge spent filter medium into said stack means, and a collection chamber separated from said inner gas chamber by a wall means, the lower end of said stack means communicating with said collection chamber so as to discharge spent filter medium passing therethrough into said collection chamber.

14. Apparatus as claimed in claim 13, wherein the outer wall means and the inner wall means of said filter chambers are formed by spaced longitudinally extending ring-like walls having an inclination of about 5° with respect to the vertical.

15. Apparatus as claimed in claim 14, wherein said ring-like walls are vertically inclined such that the diameter of the inner wall is smaller at the upper edge than at the lower edge, and the diameter of the outer wall is greater at the upper edge than at the lower edge.

16. Apparatus as claimed in claim 14, wherein said filter medium inlet means is annular and is defined by the upper edges of the ring-like walls, and the ring-like walls at their lower edges form said annular outlet for spent filter medium.

17. Apparatus as claimed in claim 13, wherein there is provided means for adjusting the height of the bed of filter medium in the filter chambers.

* * * * *